Figure 1:
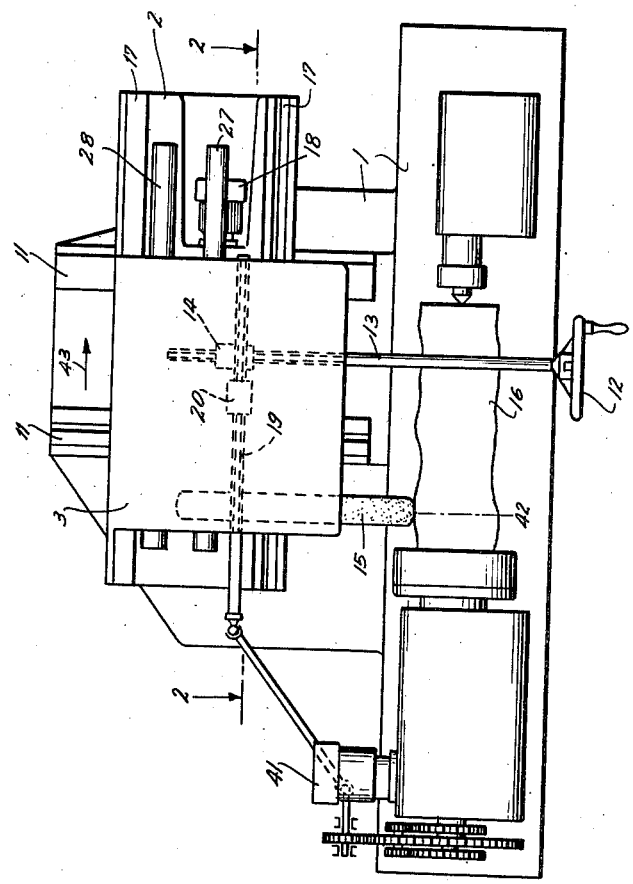

Sept. 17, 1957 R. MUSYL 2,806,330
APPARATUS FOR MANUFACTURING PROFILED BODIES
Filed Oct. 20, 1953 5 Sheets-Sheet 2

INVENTOR.
Robert Musyl
BY
Michael S. Striker

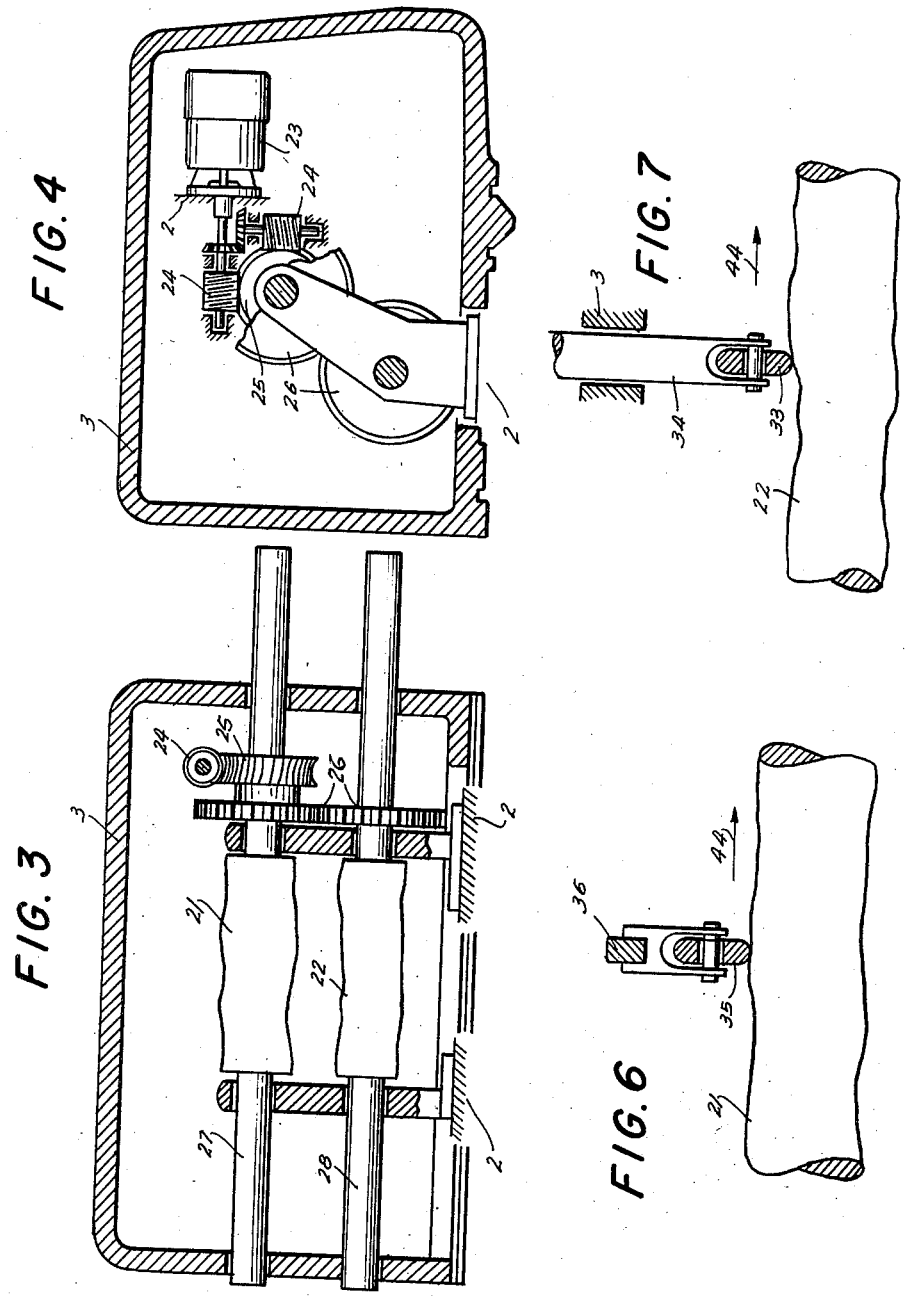

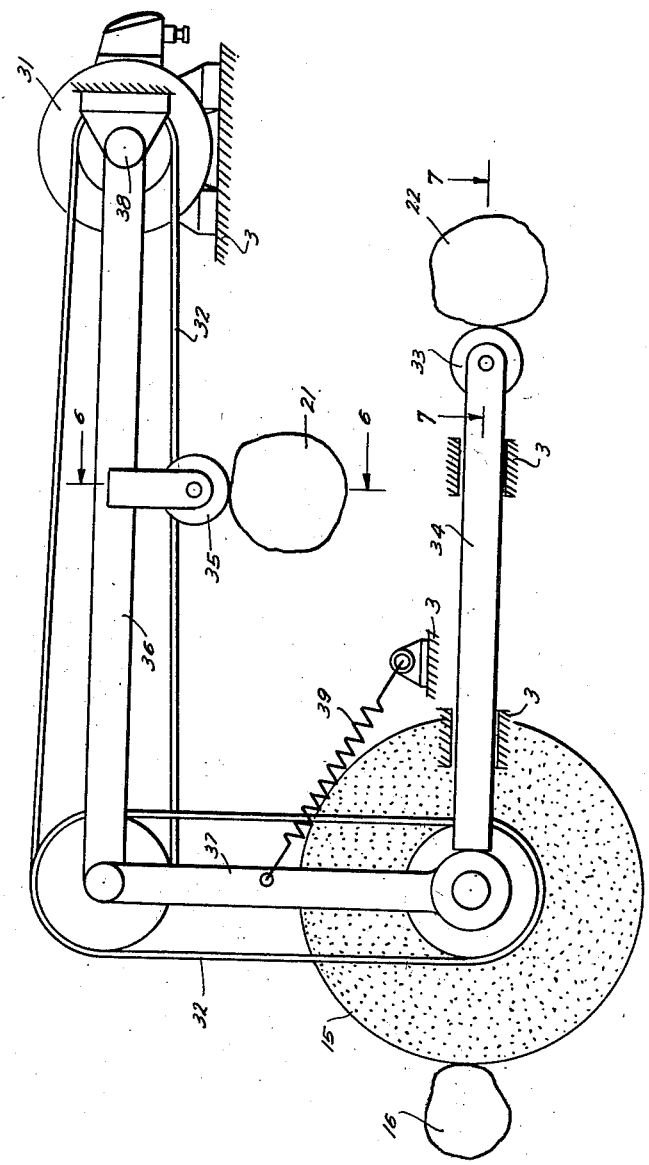

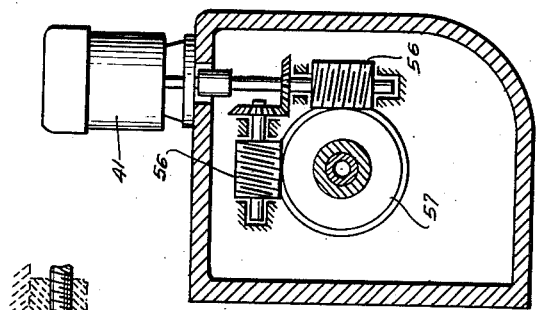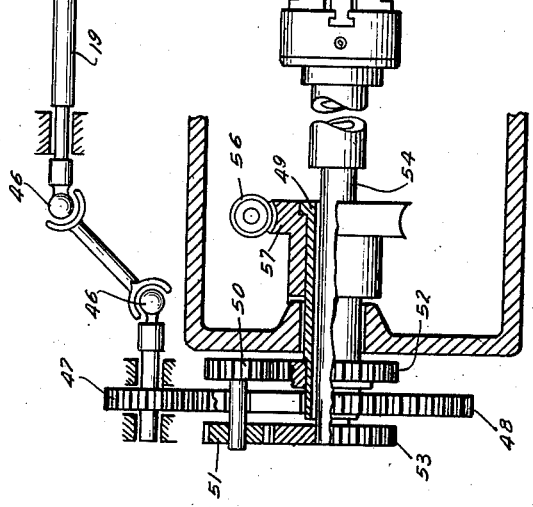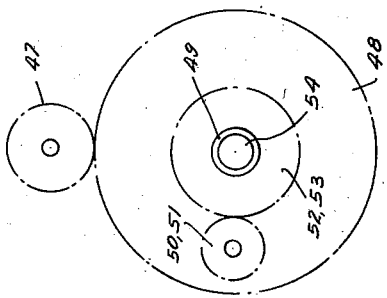

United States Patent Office 2,806,330
Patented Sept. 17, 1957

2,806,330

APPARATUS FOR MANUFACTURING PROFILED BODIES

Robert Musyl, Vienna, Austria

Application October 20, 1953, Serial No. 387,248

Claims priority, application Austria October 25, 1952

10 Claims. (Cl. 51—101)

The invention relates to an apparatus for forming spatially curved surfaces on bodies by machining, in which the cutting tool (grinding wheel 15, milling cutter or the like) has imparted thereto a working movement composed of individual movements derived from cam rollers rotating interdependently with the work piece, the entire cam periphery of these rollers being used for deriving said individual movements.

In the drawing an example of the subject of the invention embodied in a grinding machine is shown.

Figure 2:
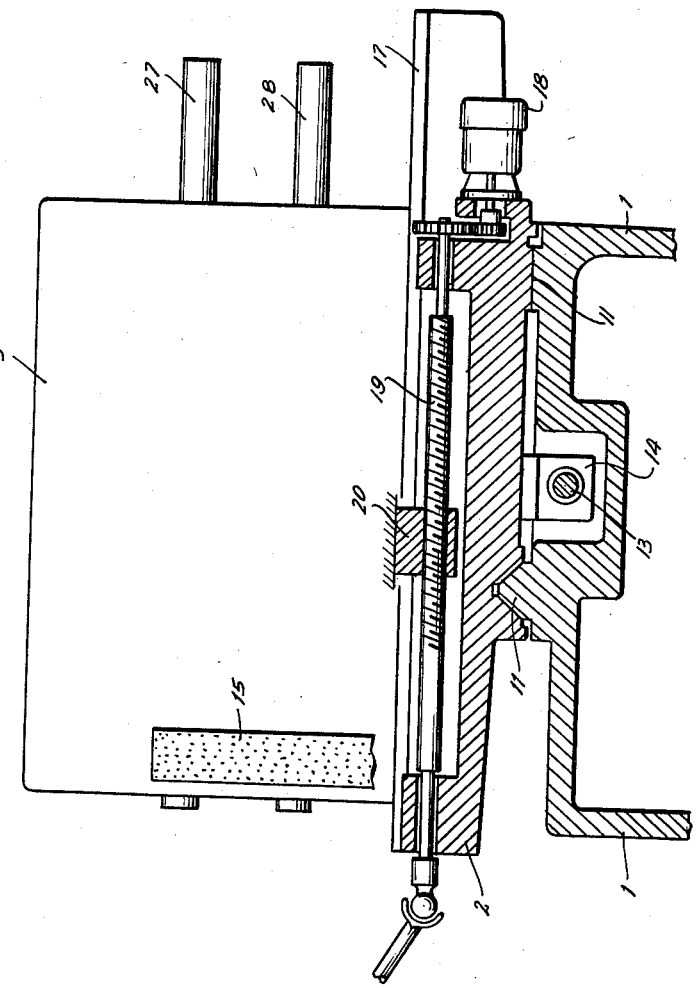

Fig. 1 shows the grinding machine in top plan view, Fig. 2 shows the essential parts of this machine in a partly sectional elevation taken along line 2—2 of Fig. 1. Figs. 3 and 4 show the two control bodies and their drive means in coordinated partly sectional views, Fig. 5 represents the mechanism for driving and controlling the grinding wheel, which mechanism is provided in the wheel stand. Figs. 6 and 7 are sectional views taken along lines VI—VI and VII—VII, respectively, of Fig. 5. Figs. 8, 9 and 10 are coordinated views illustrating an accessory. The figures are partly diagrammatic.

As may be seen from Figs. 1 and 2 the grinding machine has a base part or support means 1, on which the cross slide 2 can slide in ways 11. For the performance of such sliding movements a handwheel 12 is prvoided, whose screw spindle 13 runs in a hole 14, provided with a female thread, of the cross-slide 2. It is stated here already that by the operation of the handwheel 12 the grinding wheel 15 can be displaced relative to the workpiece 16 to be manufactured, e. g. to adjust the depth of cutting (so-called feed adjustment).

Mounted on the cross slide 2, the wheel stand 3 is slidable in ways 17 parallel to the longitudinal axis of the workpiece 16. That displacement is effected by moving means that is the motor 18 through screw spindle 19 and the hole 20 having a female thread and fixed on the wheel stand 3. Cross slide 2 and wheel stand 3 form carriage means carrying the work tool or grinding wheel 15. The cross slide 2 forming the first carriage means mounted on the support means 1 for movement relative thereto towards and away from the axis of the work piece 16, the wheel stand 3 forming the second carriage means mounted on the first carriage means for movement in the direction of the work axis.

According to Figs. 3 and 4 the wheel stand 3 extends around the two cam rollers 21 and 22 firmly arranged on the cross slide 2. Frist and second cam means shown in the drawings as cam rollers 21 and 22 are rotated by a motor 23 also fixed on the cross slide 2. The cam roller 21 is driven through worm 24 and a wormwheel 25; at the same time the drive of the second cam roller 22 is effected by means of two gears 26. The shafts 27 and 28 mounting these rollers 21 and 22 are extended at both ends of the rollers as shown so that the wheelstand 3 can be displaced to the left and right (Fig. 3) and the shafts 27 and 28 remain in engagement with the walls of the wheelstand 3.

The wheelstand 3 has firmly attached thereto the mechanism shown in Fig. 5 and consisting substantially of a motor 31, which through belts 32 rotates the grinding wheel 15. With reference to Fig. 5 the grinding wheel 15 is controlled in a horizontal direction by the cam roller 22 through follower 33 and rod 34. The control in the vertical direction is transmitted to the grinding wheel 15 from cam roller 21 through follower 35 and the two levers 36 and 37. The lever 36 is arranged to be pivotally movable at 38 about the axis of the shaft of motor 31. To maintain the follower 33 always in engagement with its cam roller 22, a spring 39 is arranged, as shown in Fig. 5. By a suitable design of the cam rollers 21 and 22 the mechanism described permits of machining the workpiece 16 to be manufactured always in the normal of the curve, i. e. always at right angles to the tangents at the several points of the profile of the workpiece 16. Such machining always in the normal of the curve is known per se, also in another, similar construction. Machining a workpiece in the normal of the curve has the advantage that any variations of the grinding wheel diameter (e. g. as a result of wear) of them do not involve faults of the workpiece to be manufactured. For a further description of this arrangement reference may be had to U. S. Patent No. 2,553,831.

In view of the description given hereinbefore the process of manufacturing a workpiece 16 can be explained. According to Fig. 1 the accessory (epicyclic gearing), which will be explained hereinafter, is disengaged. The workpiece 16 is held in the usual manner between the headstock and the footstock and is rotated by first drive means, that is the motor 41, which runs in dependence of e. g. in synchronism with second drive means, that is the motor 23 driving the cam rollers 21 and 22. During one turn of cam rollers 21 and 22 the workpiece 16 will make one turn too. In a discrete cross section of the workpiece 16, e. g. in the cross section lying in the plane of the drawing of Fig. 5, the periphery will then be profiled as desired. The same cross section is situated in Fig. 1, e. g. at the point 42. However, the workpiece 16 is to be machined not only at the cross section 42 but also at all other cross sections parallel thereto. To this end the wheel stand with its mechanism illustrated in Fig. 5 is displaced to the right in the direction of arrow 43, see Fig. 1. The cam rollers 21 and 22 are firmly supported on the cross slide 2. Hence the followers 33 and 35 are also displaced to the right, e. g. in the direction of arrows 44, as may be seen from Figs. 6 and 7. It is apparent that in this operation the rollers 21 and 22 are traced by the followers 33, 35 along helical lines, the lead of which may be chosen as small as desired. Thus the cam rollers are practically traced spatially and the workpiece 16 is spatially shaped to be profiled correspondingly. The lead of said helical lines is determined by the speed of motor 23 and the transmission ratios of the worms 24 and the worm wheel 25, and by the speed of motor 18. After the sense of rotation of motor 18 has been changed, the handwheel 12 can be operated to approach the wheelstand 3 with the grinding wheel 15 closer to the workpiece so that another cut is made during the return of the wheelstand 3, with the same control of the mechanism shown in Fig. 5, etc.

In the manner described workpieces can be manufactured practically in any form desired, though for complicated profiles to be formed the cam rollers 21 and 22 are complicated too. In that case the determination of the proper shape of these rollers and their manufacture is difficult.

To manufacture, e. g. a workpiece 16 which is to be profiled in a specific way similar to a screw propeller having helically twisted surfaces, an accessory as shown in Figs. 8 to 10 may be used. In that case the appertaining cam rollers 21 and 22 become correspondingly simpler. By this accessory the rotary movement imparted to the workpiece 16 by the motor 41 is superimposed by another rotary movement effected by an epicyclic gearing. To this end the spindle 19 reciprocating the wheelstand 3 is connected at 46 by a universal joint to a gear 47 meshing with another gear 48, which rotates freely on sleeve 49 and bodily moves two gears 50 and 51 of substantially the same size in mesh with the two gears 52 and 53 which are also of substantially the same size as illustrated in Fig. 8. The last-mentioned gear 53 is keyed on the drive shaft 54 of the workpiece 16 and thus always rotates at the speed of workpiece 16, which is generally determined by motor 41. If the spindle 19 is not operatively connected to the gear 47, and if rotation of the gear 47 is prevented the motor 41 drives the work piece-carrying shaft 54, the epicyclic or planetary gearing being inoperative.

To exercise such influence a motor 41 is arranged, which through worms 56 rotates the wormwheel 57 firmly connected to sleeve 49. Thus the desired influence is exercised on shaft 54 and workpiece 16 through gears 52, 50, 51, 48, 47 and, finally 53. If, on the other hand, the spindle 19 is operatively connected to the gear 47 through the universal joint 46, the gear 48 is rotated about its axis so that the speed of rotation of the shaft 54 will be varied and will bear a predetermined relationship to the speed of rotation of the spindle 19, the speed of rotation of which spindle determines the rate at which the wheel stand 3 is moved in the direction of the work axis of the work piece 16. On principle, the motor 41 driving the shaft 54 must permit of such influence being exercised and for this reason must not have a constant speed. Otherwise the motor 18 must be capable of adapting its speed, with the same final result. The twist of the profile body to be manufactured can be varied as desired by a suitable adaptation of the transmission ratios of the accessory. The above described gear train 47—53 and 56, 7 together with the universal joints 46 and the other elements associated with the gear train form therefore motion transmitting means interconnecting the moving means, or the motor 18, with the first driving means, or the motor 41, for varying the predetermined speed of the work piece 16 so that the predetermined speed of the work piece has a second predetermined relationship to the rate at which the moving means move the carriage means 2, 3 with the grinding wheel 15 in direction of the axis of the work piece 16.

The invention is not restricted to the example shown. When the cross slide 2 can be arranged also at an angle to the axis of the workpiece 16, the workpiece 16 can be given a tapering overall shape and still be profiled as desired. Obviously the cam rollers 21 and 22 can rotate in the same sense if an idler is arranged between the gears 26. If a speed change gearing is arranged in the accessory according to Fig. 8, e. g. between the universal joint 46 and the gear 47, the twisted profiles desired may be obtained with twisted surfaces of varying lead. For instance, the twist of the workpiece may be decreased on one side at a predetermined rate. Since the cutting process need not take place in the normal of the curve, the mechanism according to Fig. 5 may be replaced by another, similar drive, of a type known in machine tool engineering. When the footstock and headstock are rotatable about the longitudinal axis of the workpiece 16, the accessory according to Fig. 8 may be arranged to act on the footstock and headstock. In that case the motors 18 and 41 may have constant-speed characteristics and consist, e. g. of synchronous motors. In that case these given speeds are superimposed by the speed transmitted from the accessory for producing the twist. If desired the entire arrangement may be such that during one turn of the control members 21, 22 the workpiece performs only part of a turn. Obviously the three control movements need not be performed not all by the tool but can be performed all by the workpiece or by both the workpiece and the tool.

I claim:
1. A machine tool comprising, in combination, support means for supporting a work piece for rotation about a work axis; carriage means mounted on said support means for movement relative thereto in the direction of said work axis; work tool means for working the work piece and carried by said carriage means for movement therewith in the direction of said work axis and for movement toward and away from said work axis; moving means for moving said carriage means together with said work tool means in the direction of said work axis; at least first and second cam means rotatably mounted on said support means and engaging said work tool means for moving the same toward and away from said work axis during rotation of said cam means, said first and second cam means including, respectively, first and second shaft members slidably engaging said carriage means during movement thereof in the direction of said work axis; and driving means for rotating the work piece about said work axis thereof at a predetermined speed and for rotating said first and second cam means at a speed having a predetermined relationship to said predetermined speed of the work piece.

2. A machine tool comprising, in combination, support means for supporting a work piece for rotation about a work axis; carriage means mounted on said support means for movement relative thereto in the direction of said work axis; work tool means for working the work piece and carried by said carriage means for movement therewith in the direction of said work axis and for movement toward and away from said work axis; moving means for moving said carriage means together with said work tool means in the direction of said work axis at a predetermined rate; at least first and second cam means rotatably mounted on said support means and engaging said work tool means for moving the same toward and away from said work axis during rotation of said cam means; first driving means for rotating the work piece about said work axis thereof at a predetermined speed; second driving means for rotating said first and second cam means at a speed having a first predetermined relationship to said predetermined speed of the work piece; and motion transmitting means interconnecting said moving means and said first driving means for varying said predetermined speed of the work piece so that said predetermined speed of the work piece has a second predetermined relationship to said rate at which said moving means moves said carriage means together with said work tool means in the direction of said work axis.

3. A machine tool comprising, in combination, support means for supporting a work piece for rotation about a work axis; carriage means mounted on said support means for movement relative thereto in the direction of said work axis; work tool means for working the work piece and carried by said carriage means for movement therewith in the direction of said work axis and for movement toward and away from said work axis; moving means for moving said carriage means together with said work tool means in the direction of said work axis at a predetermined rate; at least first and second cam means rotatably mounted on said support means and engaging said work tool means for moving the same toward and away from said work axis during rotation of said cam means; first driving means for rotating the work piece about said work axis thereof at a predetermined speed; second driving means for rotating said first and second cam means at a speed having a first predetermined relationship to said predetermined speed of the work piece, and motion transmitting means interconnecting said moving means and said first driving means for varying said predetermined speed of the work piece so that said predetermined speed of the work piece has a second predetermined relationship to said rate at which said moving means moves said carriage means together with said work tool means in the direction of said work axis, said motion transmitting means including planetary gear means operatively associated with said moving means and said first driving means.

4. A machine tool, comprising, in combination, support means for supporting a work piece for rotation about a work axis; first carriage means mounted on said support means for movement relative thereto toward and away from said work axis; second carriage means mounted on said first carriage means for movement relative thereto and to said support means in the direction of said work axis; work tool means for working a work piece and carried by said second carriage means for movement therewith in the direction of said work axis and for movement relative to said second carriage means toward and away from said work axis; first moving means for moving said first carriage means together with said second carriage means and said work tool means toward and away from said work axis; second moving means for moving said second carriage means together with said work tool means in the direction of said work axis at a predetermined rate; at least first and second cam means rotatably mounted on said first carriage means and engaging said work tool means for moving the same toward and away from said work axis during rotation of said cam means; and driving means for rotating the work piece about said work axis thereof at a predetermined speed and for rotating said first and second cam means at a speed having a predetermined relationship to said predetermined speed of the work piece.

5. A machine tool, comprising, in combination, support means for supporting a work piece for rotation about a work axis; first carriage means mounted on said support means for movement relative thereto toward and away from said work axis; second carriage means mounted on said first carriage means for movement relative thereto and to said support means in the direction of said work axis; work tool means for working a work piece and carried by said second carriage means for movement therewith in the direction of said work axis and for movement relative to said second carriage means toward and away from said work axis; first moving means for moving said first carriage means together with said second carriage means and said work tool means toward and away from said work axis; second moving means for moving said second carriage means together with said work tool means in the direction of said work axis at a predetermined rate; at least first and second cam means rotatably mounted on said first carriage means and engaging said work tool means for moving the same toward and away from said work axis during rotation of said cam means, said first and second cam means including, respectively, first and second shaft members slidably engaging said second carriage means during movement thereof in the direction of said work axis; and driving means for rotating the work piece about said work axis thereof at a predetermined speed and for rotating said first and second cam means at a speed having a predetermined relationship to said predetermined speed of the work piece.

6. A machine tool, comprising, in combination, support means for supporting a work piece for rotation about a work axis; first carriage means mounted on said support means for movement relative thereto toward and away from said work axis; second carriage means mounted on said first carriage means for movement relative thereto and to said support means in the direction of said work axis; work tool means for working the work piece and carried by said second carriage means for movement therewith in the direction of said work axis and for movement relative to said second carriage means toward and away from said work axis; first moving means for moving said first carriage means together with said second carriage means and said work tool means toward and away from said work axis; second moving means for moving said second carriage means together with said work tool means in the direction of said work axis at a predetermined rate; at least first and second cam means rotatably mounted on said first carriage means and engaging said work tool means for moving the same toward and away from said work axis during rotation of said cam means; first driving means for rotating the work piece about said work axis thereof at a predetermined speed; second driving means for rotating said first and second cam means at a speed having a first predetermined relationship to said predetermined speed of the work piece; and motion transmitting means interconnecting said second moving means and said first driving means for varying said predetermined speed of the work piece so that said predetermined speed of the work piece has a second predetermined relationship to said rate at which said second moving means moves said second carriage means together with said work tool means in the direction of said work axis.

7. A machine tool comprising, in combination, support means for supporting a workpiece for rotation about a work axis; carriage means mounted on said support means for movement relative thereto substantially in the direction of said work axis; a rotary tool for working the workpiece, said rotary tool being mounted for rotation about an axis parallel to said direction and being movable in a first direction substantially parallel to said tool axis and a second direction substantially normal to said tool axis; tool support means for supporting said tool for turning movement and for movement in said first and second directions and mounted on said carriage means; first and second cam means mounted on said support means for rotation about said first and second axes of rotation, respectively, and engaging said tool support means for moving said tool toward and away from said work axis during rotation of said cam means; moving means for moving said carriage means together with said tool support means substantially in the direction of said work axis; and driving means for rotating the workpiece about said work axis thereof at a predetermined speed and for rotating said first and second cam means about said first and second axes of rotation thereof, respectively, at a speed having a predetermined relationship to said predetermined speed of the workpiece.

8. A machine tool comprising, in combination, support means for supporting a workpiece for rotation about a work axis; carriage means mounted on said support means for movement relative thereto substantially in the direction of said work axis; a rotary tool for working the workpiece, said rotary tool being mounted for rotation about an axis parallel to said direction and being movable in a first direction substantially parallel to said tool axis and a second direction substantially normal to said tool axis; lever means for supporting said tool for turning movement and for movement in said first and second directions and mounted on said carriage means; first and second cam means mounted on said support means for rotation about said first and second axes of rotation, respectively, and engaging said lever means for moving said tool toward and away from said work axis during rotation of said cam means; moving means for moving said carriage means together with said lever means substantially in the direction of said work axis; and driving means for rotating the workpiece about said work axis thereof at a predetermined speed and for rotating said first and second cam means about said first and second axes of rotation thereof, respectively, at a speed having a predetermined relationship to said predetermined speed of the workpiece.

9. A machine tool comprising, in combination, support means for supporting a workpiece for rotation about a work axis; carriage means mounted on said support means for movement relative thereto substantially in the direction of said work axis; a rotary tool for working the workpiece, said rotary tool being mounted for rotation about an axis parallel to said direction and being movable in a first direction substantially parallel to said tool axis and a second direction substantially normal to said tool axis; lever means for supporting said tool for turning movement and for movement in said first and second directions, said lever means comprising a first lever pivotally mounted at one end thereof on said carriage means for turning movement about an axis parallel to said tool axis, and a second lever pivotally mounted on the other end of said first lever for turning movement about an axis parallel to said tool axis and carrying on the other end thereof said tool for rotation about its axis; first and second cam means mounted on said support means for rotation about said first and second axes of rotation, respectively, said first and second cam means respectively engaging said first and second lever for moving said tool toward and away from said work axis during rotation of said cam means; moving means for moving said carriage means together with said lever means substantially in the direction of said work axis; and driving means for rotating the workpiece about said work axis thereof at a predetermined speed and for rotating said first and second cam means about said first and second axes of rotation thereof, respectively, at a speed having a predetermined relationship to said predetermined speed of the workpiece.

10. A machine tool comprising, in combination support means for supporting a workpiece for rotation about a work axis; carriage means mounted on said support means for movement relative thereto substantially in the direction of said work axis; a rotary tool for working the workpiece, said rotary tool being mounted for rotation about an axis parallel to said direction and being movable in a first direction substantially parallel to said tool axis and a second direction substantially normal to said tool axis; lever means for supporting said tool for turning movement and for movement in said first and second directions, said lever means comprising a first lever pivotally mounted at one end thereof on said carriage means for turning movement about an axis parallel to said tool axis, and a second lever pivotally mounted on the other end of said first lever for turning movement about an axis parallel to said tool axis and carrying on the other end thereof said tool for rotation about its axis; first and second cam means mounted on said support means for rotation about said first and second axes of rotation, respectively, said first and second cam means respectively engaging said first and second lever for moving said tool toward and away from said work axis during rotation of said cam means; a drive motor for driving said tool mounted on said carriage means and having an axis coinciding with the turning axis of said first lever; transmission means mounted on said first and second lever and operatively connected to said tool for transmitting the drive from said motor to said tool; moving means for moving said carriage means together with said lever means substantially in the direction of said work axis; and driving means for rotating the workpiece about said work axis thereof at a predetermined speed and for rotating said first and second cam means about said first and second axes of rotation thereof, respectively, at a speed having a predetermined relationship to said predetermined speed of the workpiece.

References Cited in the file of this patent

UNITED STATES PATENTS

| | | |
|---|---|---|
| 1,863,570 | Lees | June 21, 1932 |
| 1,919,290 | Christman | July 25, 1933 |
| 2,507,734 | Perry | May 16, 1950 |
| 2,553,831 | Musyl | May 22, 1951 |
| 2,592,875 | Durland | Apr. 15, 1952 |

FOREIGN PATENTS

| | | |
|---|---|---|
| 13,384 | Great Britain | July 10, 1899 |
| 119,411 | Great Britain | Oct. 3, 1918 |
| 544,837 | Great Britain | Apr. 29, 1942 |